United States Patent
Beach et al.

(10) Patent No.: US 10,787,367 B2
(45) Date of Patent: Sep. 29, 2020

(54) REMOVAL OF GASEOUS NH3 FROM AN NH3 REACTOR PRODUCT STREAM

(71) Applicant: Starfire Energy, Aurora, CO (US)

(72) Inventors: Joseph D. Beach, Aurora, CO (US); Jonathan D. Kintner, Aurora, CO (US); Adam W. Welch, Aurora, CO (US)

(73) Assignee: Starfire Energy, Aurora, CO (US)

( * ) Notice: Subject to any disclaimer, the term of this patent is extended or adjusted under 35 U.S.C. 154(b) by 253 days.

(21) Appl. No.: 15/989,946

(22) Filed: May 25, 2018

(65) Prior Publication Data
US 2018/0339911 A1   Nov. 29, 2018

Related U.S. Application Data

(60) Provisional application No. 62/511,862, filed on May 26, 2017, provisional application No. 62/590,570, filed on Nov. 25, 2017.

(51) Int. Cl.
   *C01C 1/04*    (2006.01)
   *F17C 11/00*   (2006.01)

(52) U.S. Cl.
   CPC .......... *C01C 1/0417* (2013.01); *C01C 1/0458* (2013.01); *F17C 11/00* (2013.01); *F17C 2225/033* (2013.01); *F17C 2225/035* (2013.01); *F17C 2227/0157* (2013.01); *F17C 2227/0302* (2013.01)

(58) Field of Classification Search
   CPC ..... C01C 1/0417; C01C 1/0458; F17C 11/00; F17C 2225/033; F17C 2225/035; F17C 2227/0157; F17C 2227/0302
   See application file for complete search history.

(56) References Cited

U.S. PATENT DOCUMENTS

| | | |
|---|---|---|
| 3,344,052 A | 9/1967 | Yeh |
| 3,519,546 A | 7/1970 | Lee |
| 3,721,532 A * | 3/1973 | Wright .................. B01J 8/0005 422/148 |
| 4,215,099 A | 7/1980 | Pinto et al. |
| 5,711,926 A | 1/1998 | Knaebel |
| 6,471,932 B1 | 10/2002 | Gieshoff et al. |
| 6,609,570 B2 | 8/2003 | Wellington et al. |
| 6,712,950 B2 | 3/2004 | Denvir et al. |

(Continued)

FOREIGN PATENT DOCUMENTS

| | | |
|---|---|---|
| WO | WO 2002/016031 | 2/2002 |
| WO | WO 2007/104569 | 9/2007 |
| WO | WO 2010/114386 | 10/2010 |

OTHER PUBLICATIONS

US 8,585,996 B2, 11/2013, Nakamura et al. (withdrawn)

(Continued)

*Primary Examiner* — Anthony J Zimmer
(74) *Attorney, Agent, or Firm* — Holzer Patel Drennan

(57) ABSTRACT

The present invention is directed to the removal of ammonia from an ammonia reactor product stream. Systems and methods of the present invention enable ammonia to be synthesized and removed using a broader range of process conditions than are possible with current industrial practices. In particular, the systems and methods enable the use of higher temperatures, lower pressures, and higher reactant flows.

19 Claims, 7 Drawing Sheets

(56) References Cited

U.S. PATENT DOCUMENTS

| | | | |
|---|---|---|---|
| 6,739,394 | B2 | 5/2004 | Vinegar et al. |
| 6,881,308 | B2 | 4/2005 | Denvir et al. |
| 7,314,544 | B2 | 1/2008 | Murphy et al. |
| 8,623,313 | B2 | 1/2014 | Nakamura et al. |
| 8,789,586 | B2 | 7/2014 | de Rouffignac et al. |
| 9,108,858 | B2 | 8/2015 | McDonald et al. |
| 2001/0018039 | A1* | 8/2001 | Gam .................. B01J 8/0453 423/360 |
| 2003/0211026 | A1* | 11/2003 | Moore .................. C01C 1/0405 423/359 |
| 2004/0039514 | A1 | 2/2004 | Steichen et al. |
| 2005/0247050 | A1 | 11/2005 | Kaboord et al. |
| 2006/0039847 | A1 | 2/2006 | Kaboord et al. |
| 2006/0204651 | A1 | 9/2006 | Wai et al. |
| 2008/0193360 | A1 | 8/2008 | Holbrook et al. |
| 2012/0308467 | A1 | 12/2012 | Carpenter et al. |
| 2013/0183224 | A1 | 7/2013 | Hosono et al. |
| 2013/0224476 | A1 | 8/2013 | Zheng et al. |
| 2015/0184281 | A1 | 7/2015 | Ito et al. |
| 2015/0239747 | A1 | 8/2015 | Hosono et al. |
| 2017/0087537 | A1 | 3/2017 | Zhang et al. |
| 2017/0088433 | A1 | 3/2017 | Kageyama et al. |
| 2017/0253492 | A1 | 9/2017 | Beach et al. |

OTHER PUBLICATIONS

International Preliminary Report on Patentability for International (PCT) Patent Application No. PCT/US17/20201, dated Sep. 13, 2018, 10 pages.

International Search Report and Written Opinion for International (PCT) Patent Application No. PCT/US18/32759, dated Aug. 1, 2018, 15 pages.

"Comparative Quantitative Risk Analysis of Motor Gasoline, LPG, and Anhydrous Ammonia as an Automotive Fuel," Quest Consultants Inc., 2009, Iowa State University, 59 pages.

"KAAPtm Ammonia Synthesis Converter," KBR, 2011, retrieved from https://web.archive.org/web/20111015180221/http://www.kbr.com/Technologies/Proprietary-Equipment/KAAP-Ammonia-Synthesis-Converter/, 1 page.

"Targets for Onboard Hydrogen Storage Systems for Light-Duty Vehicles," U.S. Department of Energy Office of Energy Efficiency and Renewable Energy and the Freedom CAR and Fuel Partnership, Sep. 2009, 22 pages.

"Tracking Industrial Energy Efficiency and CO2 Emissions," International Energy Agency, 2007, pp. 82-85.

Denholm et al., "Grid Flexibility and storage required to achieve very high penetration of variable renewable electricity," Energy Policy, 2011, vol. 39(3), pp. 1817-1830, abstract only, 2 pages.

Frigo et al., "Further Evolution of an Ammonia Fuelled Range Extender for Hybrid Vehicles," NH3 Fuel Conference, Sep. 21-24, 2014, 23 pages.

Giamello, "Heterogeneous catalysis: Teaching an old material new tricks," Nature Chemistry, 2012, vol. 4(11), pp. 869-870, abstract only, 2 pages.

Haputhanthri, "Ammonia as an alternate transport fuel: Emulsifiers for gasoline ammonia fuel blends and real time engine performance," NH3 Fuel Conference, Sep. 22, 2014, 24 pages.

Inoue et al., "Highly Dispersed Ru on Electride [Ca24Al28O64]4+(e-)4 as a Catalyst for Ammonia Synthesis," ACS Catalysis, 2014, vol. 4(2), pp. 676, 679, abstract only, 1 page.

Kaiser, "10 Billion Plus: Why World Population Projections Were Too Low," Science Insider, 2011, retrieved from http://www.sciencemag.org/news/2011/05/10-billion-plus-why-world-population-projections-were-too-low, 5 pages.

Kitano et al., "Ammonia Synthesis using a stable electride as an electron donor and reversible hydrogen store," Nature Chemistry, 2012, vol. 4, pp. 934-940, abstract only, 2 pages.

Marnellos et al., "Synthesis of ammonia at atmospheric pressure with the use of solid state proton conductors," Journal of Catalysis, 2000, vol. 193(1), pp. 80-87, abstract only, 2 pages.

Matsuishi et al., "High-density electron anions in a nanoporous single crystal: [Ca24 Al28 O64]4+(4e-)," Science, 2003, vol. 301(5633), pp. 626-629, abstract only, 3 pages.

Singh et al., "KRES-ESTM Revamp Makes More Ammonia from Less Natural Gas by Energy Substitution," Session 4, Nitrogen & Syngas Conference, Feb. 21-24, 2011, abstract only, 1 page.

Yiokari et al., "High-pressure electrochemical promotion of ammonia synthesis over an industrial iron catalyst," Journal of Physical Chemistry A, 2000, vol. 104(46), pp. 10600-10602, abstract only, 1 page.

International Search Report and Written Opinion for International (PCT) Patent Application No. PCT/US17/20201, dated May 11, 2017, 10 pages.

International Search Report and Written Opinion for International (PCT) Patent Application No. PCT/US18/34637, dated Aug. 27, 2018, 9 pages.

* cited by examiner

REMOVAL OF GASEOUS NH3 FROM AN NH3 REACTOR PRODUCT STREAM

CROSS REFERENCE TO RELATED APPLICATION

This application claims priority and benefit under 35 U.S.C. § 119(e) to U.S. Provisional Patent Application Ser. No. 62/511,862, filed on May 26, 2017, and U.S. Patent Application Ser. No. 62/590,570, filed on Nov. 25, 2017. Each of these references is incorporated herein in its entirety by reference.

FIELD OF THE INVENTION

This invention relates to the removal of ammonia ($NH_3$) from $NH_3$ synthesis reactor product streams, and particularly product streams that comprise nitrogen ($N_2$) and hydrogen ($H_2$) gases in addition to $NH_3$.

BACKGROUND

The threat to continued economic development and security posed by climate change driven by anthropogenic emissions of carbon dioxide ($CO_2$) is well-known to those skilled in the art. To meet this threat, energy sources that are substantially free of $CO_2$ emissions are highly sought after in both the developed and developing worlds. While several $CO_2$-free energy generation options (e.g., wind, solar, hydroelectric, and nuclear power) have been extensively developed, none presently include a practicable $CO_2$-free fuel.

Ammonia ($NH_3$) can be burned as a fuel according to the following reaction equation (1):

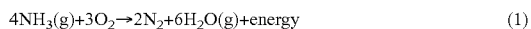

$$4NH_3(g)+3O_2 \rightarrow 2N_2+6H_2O(g)+\text{energy} \tag{1}$$

Thus, in principle, $NH_3$ can be used as a $CO_2$-free fuel, and/or as a hydrogen storage medium if thermally reformed into hydrogen and nitrogen gases. However, nearly all current $NH_3$ production processes utilize feedstocks and fuels that produce $CO_2$.

The main industrial procedure for producing ammonia is the Haber-Bosch process, illustrated in the following reaction equation (2):

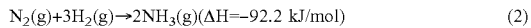

$$N_2(g)+3H_2(g) \rightarrow 2NH_3(g)(\Delta H=-92.2 \text{ kJ/mol}) \tag{2}$$

The Haber-Bosch process requires approximately 31.4 gigajoules of energy, and as of 2005 produces approximately 2.1 tonnes of $CO_2$, per tonne of $NH_3$ produced; about two-thirds of the $CO_2$ production derives from the steam reforming of hydrocarbons to produce hydrogen gas, while the remaining third derives from fuel combustion to provide energy to the synthesis plant. As of 2005, about 75% of Haber-Bosch $NH_3$ plants used natural gas as feed and fuel, while the remainder used coal or petroleum. As a result, Haber-Bosch $NH_3$ synthesis consumes between about 3% and about 5% of global natural gas production and between about 1% and about 2% of global energy production.

The Haber-Bosch reaction is generally carried out in a reactor containing an iron oxide or ruthenium catalyst at a temperature of between about 300° C. and about 550° C. and at a pressure of between about 90 bar and about 180 bar. The elevated temperature is required to achieve a higher reaction rate. Due to the exothermic nature of $NH_3$ synthesis, the elevated temperature drives the equilibrium toward the reactants, but this is counteracted by the high pressure. The high pressure also allows liquefaction of the $NH_3$ to facilitate its removal from the product stream. In commercial production, waste heat from ammonia synthesis contributes to hydrogen production by steam reforming natural gas.

SUMMARY OF THE INVENTION

Ammonia synthesis processes can occur without use of a catalyst or with the assistance of a catalyst. Conventional $NH_3$ synthesis plants using promoted iron catalyst typically produce about 0.02 moles $NH_3$ per gram of catalyst per hour, at temperatures of about 450° C. and pressures of about 2000 psig. However, more recent advances in ammonia synthesis catalysis have yielded reactors that can produces about 0.2 moles $NH_3$ per gram of catalyst per hour, at temperatures of between about 400° C. and about 600° C. and pressures of about 140 psig. However, while the lower operating pressures of this newer generation of reactors and catalysts can significantly reduce capital costs, they also make removal of $NH_3$ from the reactor product stream by liquefaction less feasible. While molecular sieves, e.g., type 4A molecular sieves, that can remove $NH_3$ from gas streams, e.g., natural gas streams, are known, the use of such sieves to separate $NH_3$ from gas streams consisting primarily of $N_2$ and $H_2$ gases has not been demonstrated.

There is thus a need in the art for systems and methods that can remove $NH_3$ in the gas phase from a low-pressure product stream comprising $N_2$ and $H_2$ gases. It is additionally advantageous that such systems and methods be compatible with conventional hardware for removing gaseous $NH_3$, such as type 4A molecular sieves.

The present invention provides systems and methods that remove $NH_3$ from a gas stream comprising $NH_3$, $N_2$, and $H_2$ gases by adsorbing the $NH_3$ onto a suitable molecular sieve, such as a type 4A, 5A, 13X or other molecular sieve, and transferring the adsorbed $NH_3$ to a storage vessel by desorbing the $NH_3$ from the molecular sieve. The $NH_3$ can be desorbed from the molecular sieve by increasing the molecular sieve's temperature or by decreasing the gas pressure, or by a combination thereof.

An aspect of the invention is a system and method that uses a molecular sieve to remove $NH_3$ from a product stream of an $NH_3$ synthesis reactor by adsorption.

The $NH_3$ can be desorbed from the molecular sieve by increasing the temperature of the molecular sieve, by decreasing the gas pressure, or by a combination thereof. The desorbed $NH_3$ can be transferred to a storage vessel at high concentrations. One or more molecular sieves can be incorporated into an overall system to produce $NH_3$.

An aspect of the invention includes multiple $NH_3$ adsorption units on an $NH_3$ production system to enable continuous synthesis of $NH_3$ while $NH_3$ is transferred from the adsorption units to one or more storage vessels. Unused reactants can be recirculated from the adsorption units back to the $NH_3$ production system. A heat exchanger can be employed to cool an output of the $NH_3$ production system to a suitable temperature for $NH_3$ adsorption and then reheat the unused reactants to near the reactor operating temperature.

An aspect of the invention is the use of one or more compressors/pumps and accumulators in series to transfer the desorbed $NH_3$ from the adsorption units to the storage vessel. If a single compressor/pump cannot maintain a sufficient pressure ratio between the storage vessel and the adsorption cannister to liquefy the removed $NH_3$, a series of compressors/pumps connected by accumulators in series or in parallel can be used to do so.

Various embodiments are directed towards ammonia synthesis and storage systems, including: a reactor configured to produce ammonia from a heated gas stream; a heat exchanger configured to heat an input gas stream including a nitrogen gas and a hydrogen gas to produce the heated gas stream and further configured to receive a product gas stream from the reactor and cool the product gas stream to produce a cooled product gas stream, where the product gas stream includes at least one of an ammonia gas, an unspent nitrogen gas, and an unspent hydrogen gas; at least one adsorption cartridge configured to adsorb at least a portion of the ammonia gas from the cooled product gas stream; at least one desorption device to desorb at least a portion of the adsorbed ammonia from the at least one adsorption cartridge; and at least one ammonia storage vessel for receiving the desorbed ammonia.

In some aspects, embodiments include systems where the input gas stream includes the nitrogen gas and the hydrogen gas combined with a recycle gas stream including a recycled amount of ammonia gas, a recycled amount of nitrogen gas, and a recycled amount of hydrogen gas. In some aspects, embodiments include systems where heat from the product gas stream heats at least one of the input gas stream and a recycle gas stream to produce the heated gas stream. In some aspects, embodiments further include at least one product stream valve, where the at least one product stream valve directs the cooled product gas stream to one or more of the at least one adsorption cartridges. In some aspects, embodiments further include at least one post adsorber valve, where the at least one post adsorber valve directs a recycle stream to the reactor.

In some aspects, embodiments include systems where the recycle stream includes at least one of a recycled nitrogen gas, a recycled hydrogen gas, and a recycled ammonia gas. In some aspects, embodiments further include at least one recycling pump to recycle the recycle stream.

In some aspects, embodiments include systems where each of the at least one adsorption cartridges comprises molecular sieves. In some aspects, embodiments include systems where each of the at least one adsorption cartridges is regenerated. In some aspects, embodiments include systems where at least one of the molecular sieves includes a type 4A, type 5A, type 13X, or larger molecular sieve. In some aspects, embodiments include systems where the molecular sieve includes a pore size of between about 3.4 angstroms and about 10 nm. In some aspects, embodiments include systems where a material of the molecular sieve is an alkaline oxide aluminosilicate or an alkaline oxide borosilicate.

In some aspects, embodiments include systems where the desorption device is a compressor. In some aspects, embodiments include systems where the desorption device is a compressor and a heater. In some aspects, embodiments include systems where the compressor reduces a pressure of the at least one adsorption cartridges to desorb the ammonia from the at least one of the adsorption cartridge. In some aspects, embodiments include systems where the pressure is between about 0 psia and about 15 psia, and a temperature between about 100° C. and about 300° C. In some aspects, embodiments include systems where the heater increases a temperature of the at least one adsorption cartridge to between about 100° C. and about 300° C. In some aspects, embodiments include systems where the compressor reduces a pressure of the at least one adsorption cartridge to between about 0 psia and about 15 psia, and where the heater increases a temperature of the at least one adsorption cartridge to between about 100° C. and about 300° C. In some aspects, embodiments include systems where the compressor reduces a pressure of the at least one adsorption cartridge to between about 0 psia and about 15 psia, and where the heater increases a temperature of the at least one adsorption cartridge to between about 230° C. and about 270° C. In some aspects, embodiments include systems where a temperature of the at least one ammonia storage vessel is between about 50° C. and about −50° C. and a pressure of the at least one ammonia storage vessel is between about 6 and about 294 psia.

In some aspects, embodiments further include at least one flare. In some aspects, embodiments further include at least one accumulator. In some aspects, embodiments further include at least one ammonia detector. In some aspects, embodiments include systems where the at least one ammonia detector detects an amount of ammonia in the recycle stream. In some aspects, embodiments further include an alarm, where the alarm alerts when a predetermined amount of ammonia is detected in the recycle stream.

In some aspects, embodiments include systems where the reactor produces ammonia by at least one process selected from the group consisting of Haber-Bosch synthesis, electrically enhanced Haber-Bosch synthesis, solid state ammonia synthesis, electrochemical ammonia synthesis, and non-thermal plasma ammonia synthesis.

Various embodiments are directed towards methods for producing ammonia, including: heating an input gas stream including a nitrogen gas and a hydrogen gas with a heat exchanger to increase a temperature of the input gas stream to produce a heated gas stream; reacting the heated gas stream in a reactor to form a product gas stream, where the product gas stream includes at least one of an ammonia gas, the nitrogen gas, and the hydrogen gas; cooling the product gas stream with the heat exchanger to produce a cooled product gas stream; adsorbing the ammonia gas from the cooled product gas stream with at least one adsorption cartridge to produce ammonia on the at least one adsorption cartridge; desorbing the ammonia from the at least one adsorption cartridge with at least one desorbing apparatus; and storing the ammonia in at least one ammonia storage vessel.

In some aspects, embodiments include methods where the input gas stream includes the nitrogen gas and the hydrogen gas combined with a recycle gas stream including a recycled amount of ammonia gas, a recycled amount of nitrogen gas, and a recycled amount of hydrogen gas. In some aspects, embodiments further include combining the recycle gas stream and the input gas stream before entering the reactor. In some aspects, embodiments include methods where a ratio of the nitrogen gas and the hydrogen gas in the input gas stream is about 75% hydrogen gas to about 25% nitrogen gas. In some aspects, embodiments include methods where a ratio of the nitrogen gas and the hydrogen gas in the input gas stream is adjusted depending on a requirement of the reactor.

In some aspects, embodiments include methods where heat from the product gas stream heats at least one of the input gas stream and a recycle gas stream to produce the heated gas stream. In some aspects, embodiments include methods where heat from the product gas stream heats the input gas stream and a recycle gas stream at a same time to produce the heated gas stream. In some aspects, embodiments include methods where the recycle gas stream includes at least one of a recycled ammonia, a recycled nitrogen gas, and a recycled hydrogen gas. In some aspects, embodiments include methods where a hot side temperature of the heat exchanger is between about 300° C. and about 600° C. and a temperature of a cold side of the heat exchanger is between about 0° C. and about 200° C. In some aspects, embodiments include methods where a hot side temperature of the heat exchanger is between about 300° C. and about 600° C. and a temperature of a cold side of the heat exchanger is between about 25° C. and about 100° C. In some aspects, embodiments include methods where a temperature of the heated gas stream is between about 300° C. and about 600° C. In some aspects, embodiments include methods where a temperature of the cooled product gas stream is between about 0° C. and about 200° C.

In some aspects, embodiments include methods where the at least one adsorption cartridge includes a molecular sieve. In some aspects, embodiments include methods where a pore size of the molecular sieve is between about 3.4 angstroms and about 10 nm. In some aspects, embodiments include methods where the molecular sieve is a type 4A, type 5A, type 13X, or larger molecular sieve. In some aspects, embodiments include methods where a material of the molecular sieve is an alkaline oxide aluminosilicate or alkaline oxide borosilicate. In some aspects, embodiments include methods where the at least one adsorption cartridge is reusable.

In some aspects, embodiments further include directing the cooled product gas stream with at least one product gas stream valve to the at least one adsorption cartridge. In some aspects, embodiments further include closing the at least one product gas stream valve to remove ammonia from the at least one adsorption cartridge.

In some aspects, embodiments further include detecting ammonia in the recycle gas stream. In some aspects, embodiments further include at least one circulation pump to recycle the at least one of the recycled ammonia gas, the recycled nitrogen gas, or the recycled hydrogen gas to the reactor. In some aspects, embodiments further include directing the product gas stream with at least one product gas stream valve to the at least one adsorption cartridge; and closing the at least one product gas stream valve to remove the ammonia from the at least one adsorption cartridge.

In some aspects, embodiments include methods where the desorbing apparatus is at least one of a compressor or a heater. In some aspects, embodiments include methods where the at least one desorbing apparatus is the compressor, where the compressor reduces a pressure of the at least one adsorption cartridge to desorb the ammonia from the at least one adsorption cartridge. In some aspects, embodiments include methods where the pressure is between about 0 psia and about 15 psia. In some aspects, embodiments include methods where the desorbing apparatus is the heater, and where the heater increases a temperature of the at least one adsorption cartridge to between about 100° C. and about 300° C. In some aspects, embodiments include methods where the compressor reduces a pressure of the at least one adsorption cartridge to between about 0 psia and about 15 psia, and where the heater increases a temperature of the at least one adsorption cartridge to between about 100° C. and about 300° C.

In some aspects, embodiments further include at least one accumulator, where the at least one accumulator accumulates the ammonia from the at least one adsorption cartridge. In some aspects, embodiments further include at least one valve to direct a gas. In some aspects, embodiments further include at least one flare.

In some aspects, embodiments include methods where the reactor produces ammonia by at least one process selected from the group consisting of Haber-Bosch synthesis, electrically enhanced Haber-Bosch synthesis, solid state ammonia synthesis, electrochemical ammonia synthesis, and nonthermal plasma ammonia synthesis. In some aspects, embodiments include methods where a temperature of the at least one ammonia storage vessel is between about 50° C. and about −50° C. and a pressure of the at least one ammonia storage vessel is between about 6 and about 294 psia

DETAILED DESCRIPTION OF THE INVENTION

Figure 1:
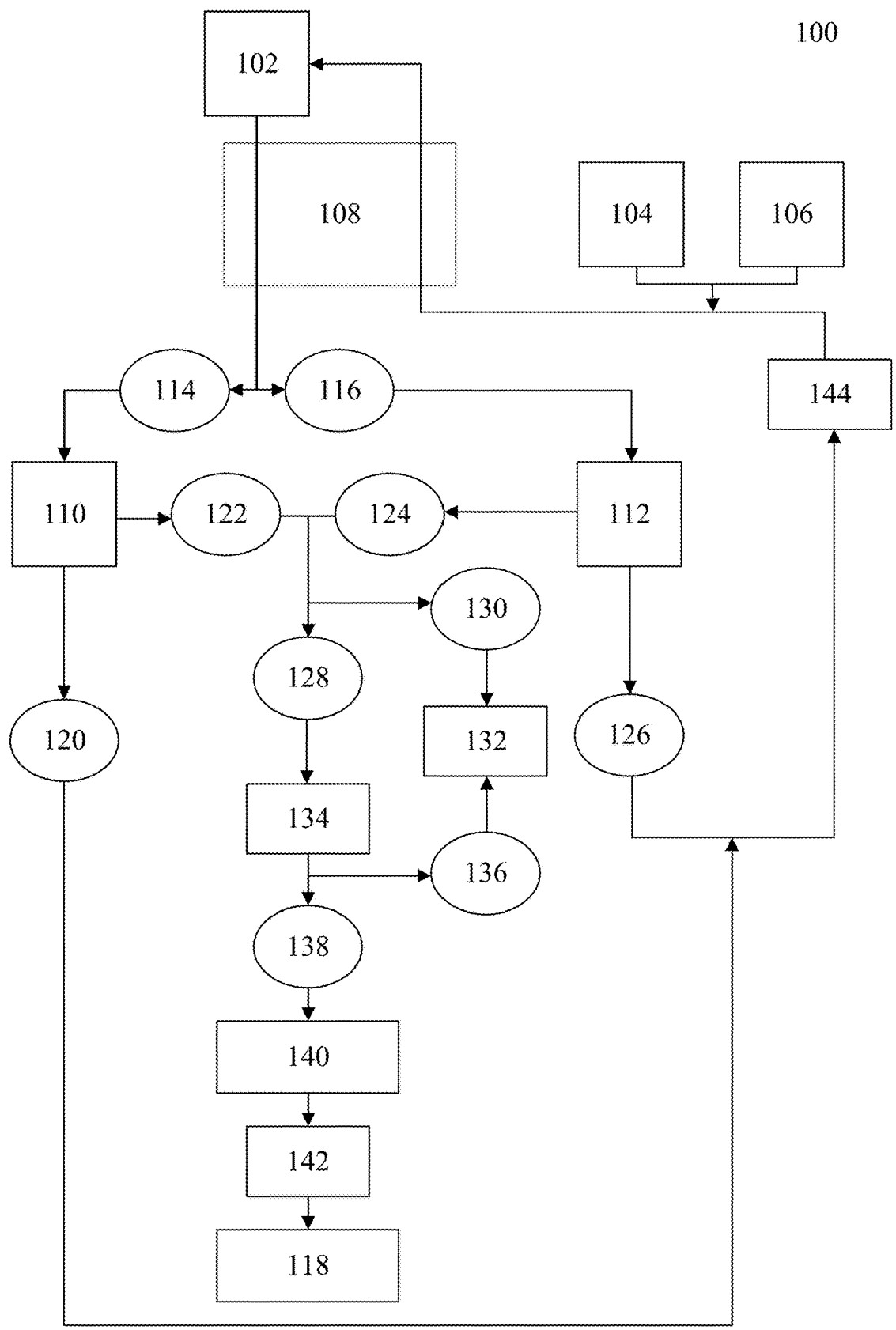
FIG. 1 illustrates a diagram of an $NH_3$ synthesis system that removes $NH_3$ from a reactor product and recirculates unused reactants back to a reactor, according to embodiments of the present invention.

The present invention is directed to systems and methods for removing $NH_3$ from a gas stream containing $NH_3$, $N_2$, and $H_2$ gases with a molecular sieve and transferring the $NH_3$ to a storage vessel.

An aspect of the invention is an ammonia synthesis and storage system. The system includes an ammonia synthesis reactor. The reactor produces ammonia from an input gas stream. The input gas stream includes nitrogen and hydrogen gases. In the case of thermal ammonia synthesis processes, the input gas stream can be heated in a heat exchanger prior to entering the reactor to produce a heated gas stream. The heat exchanger can also decrease the temperature of the product gas stream exiting the reactor. In the case of nonthermal ammonia synthesis reactors, a heat exchanger can be omitted. The product gas stream includes at least one of an ammonia gas, an unspent nitrogen gas, and an unspent hydrogen gas. The system also includes at least one adsorption cartridge. The adsorption cartridge(s) adsorbs ammonia from the product gas stream. The ammonia is removed from the adsorption cartridge with at least one desorbing device. The ammonia can be stored in at least one storage vessel.

More than one heat exchanger can be used. Also, the same heat exchanger(s) can be utilized to heat the input gas stream and cool the product gas stream. A heat exchanger can heat the input gas stream, at least in part, using the heat from the exiting product gas stream. In some embodiments, a series of heat exchangers can be utilized, which can be in parallel or in series. The temperature of the hot side of the heat exchanger can be determined by the specific $NH_3$ synthesis process that is used. For example, for thermal processes a hot side temperature between about 300° C. and about 600°

C. is desired. The temperature of the cold side of the heat exchanger can be determined by desired effectiveness of the adsorption process. In general, a range between about 0° C. and about 200° C. can be used, and in some embodiments a range between about 25° C. and about 100° C. can be used.

The reactor of the system can produce ammonia using at least one process. Illustrative processes include Haber-Bosch synthesis, electrically enhanced Haber-Bosch synthesis, solid state ammonia synthesis, electrochemical ammonia synthesis, and nonthermal plasma ammonia synthesis.

The composition of the product gas is not limited by the present disclosure and can depend on the quantities of the catalyst in the reactor, the reagent flows through the reactor, and the $NH_3$ synthesis rate of the reactor. The cooled product gas stream is sent to the adsorption cartridges. The cooled product gas stream may be sent to the adsorption cartridges via one or more valves to direct the flow of the gas stream. The adsorption cartridges can include molecular sieves. In some embodiments, the molecular sieves can be a type 4A, type 5A, type 13X, or larger molecular sieve. One skilled in the art would understand that high surface area materials with chemistries suitable for $NH_3$ adsorption can be compatible with this invention. Use of materials with large pore size and large surface area can allow fast gas transport and large amounts of $NH_3$ adsorption. The minimum usable pore size is the critical diameter of $NH_3$, which is about 3.4 angstroms. In some embodiments, the molecular sieve comprises a pore size of between about 3.4 angstroms and about 10 nanometers (nm). Materials of the molecular sieve are not limited by this disclosure. The materials may have any composition and configuration to capture (e.g., adsorb) ammonia. The materials may have any silica to alumina ratio and any hydrophobicity. A material of the molecular sieve can be an alkaline oxide aluminosilicate or an alkaline oxide borosilicate.

The adsorption cartridges can advantageously be reused once they are recharged (e.g., ammonia is removed, partially or fully, from the cartridges). An advantage of the adsorption cartridges of the present invention is that they allow hydrogen and nitrogen gas to pass through the cartridge, while adsorbing ammonia gas. In various embodiments, although nitrogen can adsorb on molecular sieves, $NH_3$ can adsorb to them preferentially, displacing the $N_2$ and allowing the molecular sieve to be used to remove $NH_3$ from a gas stream containing $N_2$, $H_2$, and $NH_3$. In some embodiments, the adsorption cartridges may adsorb various amounts of nitrogen in addition to ammonia depending on variables such as the temperature, pressure, and amounts of components; however, the presently disclosed apparatuses, methods, and systems can advantageously still enable ammonia to be synthesized and removed.

Gas exiting the adsorption cartridges (i.e., the recycled gas stream) can include unspent and/or recycled hydrogen gas, unspent and/or recycled nitrogen gas and unadsorbed ammonia gas. Ammonia gas in the gas stream exiting the adsorption cartridge can indicate that a particular adsorption cartridge is saturated, and therefore no longer adsorbing the ammonia gas from the gas stream (or no longer adsorbing a specified amount of ammonia gas from the gas stream). Thus, in some embodiments, a detector can be used to monitor whether the gas stream exiting the adsorption cartridge includes ammonia or how much ammonia is in the gas stream exiting the adsorption cartridge. The system can also include an alert (e.g., an alarm that alerts) that can be triggered based on any criteria. For example, the alert can be triggered for a certain amount of ammonia in the gas stream entering the adsorption cartridge or the alert can be triggered for a certain amount of ammonia in the gas stream exiting the adsorption cartridge. As another example, the alert can be triggered when the percentage of ammonia in the gas stream exiting the adsorption cartridge exceeds some fraction of the concentration of ammonia entering the adsorption cartridge. The specific trigger concentration of ammonia in the gas stream can be determined by apparatus operators based on their operational requirements. The alert can be triggered based on a percentage of the thermodynamic limit.

The recycled gas stream, which can include one or more gases, including the unspent/recycled nitrogen gas, unspent/recycled hydrogen gas, and unadsorbed ammonia gas can be provided to the reactor, the heat exchanger, combined with the input stream (i.e., hydrogen gas stream and/or the nitrogen gas stream), sent to a pump, or directed to one or more of these streams or devices. The recycled gas can be joined with the input gas stream.

The nitrogen gas stream and the hydrogen gas stream comprising the input gas stream can be provided in a stoichiometric ratio or other ratio required by the reactor. The ratio may vary and may be varied (e.g., adjusted) depending on what is required by the reactor. The ratio may be varied (e.g., adjusted) depending on the components of the recycled gas stream. The composition of the input gas stream can vary from pure $N_2$ to pure $H_2$. In some embodiments, it will be 75% $H_2$ and 25% $N_2$ in order to maintain the reactant composition as $NH_3$ is synthesized. In various embodiments, the components of the input gas stream may be adjusted to achieve 75% $H_2$ and 25% $N_2$ when the input gas stream is combined with the recycled gas stream. In some embodiments, the input gas stream can include ammonia gas (for example, from the recycled gas stream). The system can include a pump or series of pumps to alter the pressure of the recycled gas stream and cause the recycled gas stream to flow back through the reactor.

At least one desorbing device is utilized by the system. The desorbing device can be a pump, a compressor, a heater, or a combination of these devices. The adsorption cartridges can be exposed to the desorbing device to remove ammonia from the cartridges. The desorbed ammonia can be stored as a gas, liquid, or solid; however, liquid may be typical. One or more pumps or compressors can be used to expose the cartridges to a pressure of between about 0 pounds per square inch absolute (psia) and about 15 psia. The cartridge (s) can be exposed to a pressure of between about 1 psia and about 14 psia, or between about 3 psia and about 12 psia, or between about 5 psia and about 10 psia, or between about 6 psia and about 9 psia. The pressure may be applied in any manner, and may be varied over time. For a constant pump rate, the adsorption cartridge pressure will decrease as the $NH_3$ is removed. A heater can be used to increase the temperature of the adsorption cartridge. The temperature may be increased to any temperature below what may damage the molecular sieve. For example, the heater can increase the temperature of the adsorption cartridge to between about 100° C. and about 300° C., in some embodiments about 230-270° C. In various embodiments, the heater can increase the temperature of the adsorption cartridge to between about 200° C. and about 290° C., or between about 220° C. and about 280° C., or between about 240° C. and about 260° C. The upper temperature limit may be dictated, or partially dictated, by the temperature stability of the specific molecular sieve that is being used.

The cartridge can be exposed to a combination of pumping and heating. The combination of pumping and heating may be in any combination and at any timing. For example, the cartridge can be exposed to a combination of pumping and heating, where the pressure can be between about 0 psia and about 15 psia, and the temperature can be between about 100° C. and about 300° C. After ammonia is removed (or partially removed) from the cartridge, the cartridge can be reused in the system.

The system can also include at least one flare. The flare can be used to safely vent adsorption cannister gases, which initially include nitrogen, hydrogen, and ammonia, to the atmosphere until the desorbing gas is substantially pure $NH_3$.

The system can also include one or more accumulators if needed. The accumulator can be used to accommodate flow mismatch between pumps and compressors in the desorption subsystem. For example, a vacuum pump can transfer $NH_3$ from the adsorption cannister to an atmospheric pressure bladder accumulator and a compressor can pressurize a storage vessel with that $NH_3$ periodically when the accumulator becomes full. The system can also include a scrubber. As would be understood by one skilled in the art, the gas streams can include incidental gases, which can be scrubbed prior to entering the reactor, or after exiting the reactor at any point in the system. Incidental gases can include oxygen, water, argon, and carbon dioxide.

Various valves can be used throughout the system in any combination. For example, one or more valves can be used to direct the product gas stream to one or more of the adsorption cartridges. In some embodiments, the valves can be used to close an input product gas stream to one or more of the multiple adsorption cartridges to service the adsorption cartridges, while directing the gas to other adsorption cartridges so that the system can remain operational. Other valves can be used to direct a recycled gas stream exiting the adsorption cartridges to the heat exchanger or other devices before reentering the reactor. Some valves can be used to regulate the flow rate and amounts of the input gas streams. Still other valves can be utilized to direct ammonia to devices downstream of the cartridge. For example, valves can be used to direct ammonia to one or more of the storage vessels. Still other valves can be utilized to direct a portion of a gas stream to a flare. The materials of the valves can be selected to be compatible with the system and the materials running through the system so as not to corrode or be damaged by the materials in the system.

Pressure regulators can be utilized throughout the system to monitor the pressure within the system and maintain a safe operating pressure. In addition, one or more pumps can be utilized throughout the system to assist in directing the flow of one or more of the gases within the system. Furthermore, in some embodiments, the storage vessels can be maintained at a temperature between about 50° C. and about −50° C. to facilitate liquefaction of the $NH_3$ at about 6 psia and about 294 psia.

An aspect of the invention is a system for producing ammonia. The system includes an $NH_3$ reactor. The $NH_3$ reactor can produce $NH_3$ by any method known to those skilled in the art, including but not limited to Haber-Bosch synthesis, electrically enhanced Haber-Bosch synthesis, solid state ammonia synthesis, electrochemical ammonia synthesis, and nonthermal plasma ammonia synthesis. The input gas stream can include at least nitrogen gas and hydrogen gas. The input gas stream can be heated in a heat exchanger to produce a heated gas stream if appropriate for the $NH_3$ reactor. The gas stream can be reacted in a reactor to produce a product gas stream. The product gas stream can contain one or more component gas, which includes ammonia gas, nitrogen gas, and hydrogen gas, or combinations thereof. The nitrogen gas and/or the hydrogen gas in the product gas stream can be unspent gas, which can be recycled to the reactor as discussed within this application. If the reactor produces a hot product gas stream, it can be cooled in a heat exchanger to make a cooled product gas stream. Ammonia gas in the cooled product stream is adsorbed with at least one adsorption cartridge to produce ammonia on the adsorption cartridge(s). The ammonia is desorbed from the adsorption cartridge(s) with at least one desorbing apparatus. The ammonia is then stored in at least one ammonia storage vessel.

More than one heat exchanger can be used, and the same heat exchanger(s) can be utilized to heat the input gas stream and cool the product gas stream. A heat exchanger can heat the input gas stream, at least in part, using the heat from the exiting product gas stream. In some embodiments, a series of heat exchangers can be utilized, which can be in parallel or in series. The temperature of the hot side of the hottest heat exchanger can be determined by the specific $NH_3$ synthesis process that is used. For example, for thermal processes a hot side temperature between about 300° C. and about 600° C. is desired. The temperature of the cold side of the coldest heat exchanger can be determined by desired effectiveness of the adsorption process. For example, a range between about 0° C. and about 200° C. can be used, in some embodiments between about 25° C. and about 100° C.

The composition of the product gas can depend on the quantities of catalyst in the reactor, the reagent flows through the reactor, and the $NH_3$ synthesis rate of the reactor. The product gas is provided to adsorption cartridges, which adsorb ammonia. The adsorption cartridge can contain molecular sieves. In some embodiments, the molecular sieves can be a type 4A, type 5A, type 13X, or larger molecular sieve. One skilled in the art would understand that high surface area materials with chemistries suitable for $NH_3$ adsorption can work with this invention. Use of materials with large pore size and large surface area can be advantageous and can allow increased gas transport and a larger amount of $NH_3$ adsorption. The minimum usable pore size is the critical diameter of $NH_3$, which is about 3.4 angstroms. In some embodiments, the molecular sieve comprises a pore size of between about 3.4 angstroms and about 10 nm, in some embodiments about 1 nm. A material of the molecular sieve can be an alkaline oxide aluminosilicate or an alkaline oxide borosilicate. The adsorption cartridges can be reused once ammonia is removed from the cartridges.

The ratio of nitrogen to hydrogen in the system is selected based on the type of $NH_3$ reactor that is used. In general, it can vary from 1% hydrogen to 99% hydrogen. The make-up nitrogen and hydrogen gases, which replace the gases consumed in the $NH_3$ synthesis, can be 75% hydrogen and 25% nitrogen to maintain a consistent system gas composition. The flow rate of the make-up gas stream can be appropriate to maintain consistent system pressure. The reactor input flow is the combination of the recycled gas flow and the make-up reactant flow. The recycled gas flow can contain unspent nitrogen, unspent hydrogen, and residual ammonia. The flow of the recycled gas stream can be altered with a pump or series of pumps. The flow of the recycled gas stream can be selected based on the desired $NH_3$ synthesis rate and the properties of the $NH_3$ reactor that is being used in the system.

The saturated adsorption cartridges can be isolated from the reactor and the product gas stream can be directed to one or more other adsorption cartridges by opening and closing appropriate valves. Once isolated, the saturated adsorption cartridge can be connected to at least one desorbing device. Connecting the saturated adsorption cartridge to a desorbing device(s) may also be done by opening and closing appropriate valves. The desorbing device can remove ammonia from the adsorption cartridge. The desorbing device can remove some or all of the ammonia from the adsorption cartridge.

In various embodiments, the one or more adsorption cartridges may be the sole $NH_3$ removal mechanism in a $NH_3$ synthesis system. In addition to being the sole $NH_3$ removal mechanism in a $NH_3$ synthesis system, adsorption cartridges can also be used to remove residual $NH_3$ from the output of a condenser in $NH_3$ systems that use liquefaction for $NH_3$ removal. Liquefaction is unable to remove all of the $NH_3$ from a reactor product flow. It leaves a portion of the $NH_3$ (several percent) in the condenser exhaust. One or more adsorption cartridges can be placed downstream of the condenser to remove some or all of that residual $NH_3$, allowing pure reactants to be circulated back to the reactor. Typical liquefaction condensers operate at about 100-200 bar total pressure and less than about 100° C. The adsorption cartridge can be operated at about the same pressure and temperature. It may be advantageous to operate the adsorption cartridge(s) at a same pressure and temperature as the liquefaction condenser because, for example, process variables and process steps can be reduced. Also, use of the adsorption cartridge(s) can advantageously reduce the number of circulation loops required to make a given amount of $NH_3$, thereby increasing the system's $NH_3$ production rate.

An aspect of the invention is one or more adsorption cartridges for removing $NH_3$ from a gas stream containing $NH_3$, $N_2$, and $H_2$ gases. Each adsorption cartridge includes, for example, a cannister, a molecular sieve contained in the cannister, ports for circulating product gases through the cannister and removing desorbed gases from the cannister, internal and/or external heaters for heating the canister and/or molecular sieve, internal and/or external temperature sensors for monitoring the molecular sieve and cannister temperature, insulation on the internal surface of the cannister to help retain heat in the molecular sieve during heating, and fixed and/or removable external insulation to help retain heat in the molecular sieve during heating. If more than one adsorption cartridge is used, each adsorption cartridge may be the same as the other, or they may differ from one another. The adsorption cartridges may be located at various places within the system, and may be in series or in parallel, or both in series and in parallel. There may be multiple adsorption cartridges used in series or multiple adsorption cartridges used in parallel, or multiple used in both in series and in parallel.

FIG. 1 illustrates a system 100 for synthesizing $NH_3$, collecting the $NH_3$ from a product gas stream, recirculating unused reactants to a reactor, and transferring the collected $NH_3$ to a storage vessel. The $NH_3$ reactor 102 is supplied with $N_2$ 104 and $H_2$ 106 gases from appropriate sources for use as reactants in an ammonia synthesis reaction. The input stream can include $N_2$ 104 and $H_2$ 106 gases and may include a recycled gas stream exiting a pump 144. The input stream can be heated with the heat exchanger 108 as well as by heaters in the reactor 102. For illustrative purposes, the reactor 102 can a thermal reactor (for example, a Haber-Bosch reactor). However, the $NH_3$ reactor 102 can be produce $NH_3$ by any suitable method known to those skilled in the art, including but not limited to Haber-Bosch synthesis, electrically enhanced Haber-Bosch synthesis, solid state ammonia synthesis, electrochemical ammonia synthesis, and nonthermal plasma ammonia synthesis.

The output of the $NH_3$ reactor 102 is a mixture of $N_2$, Hz, and $NH_3$ gases. The specific mixture in the output gas will depend on the specific reactor's type and operating conditions. Nonlimiting examples of such operating conditions include reagent input rate, reagent recirculation rate, reactor temperature, and reactor pressure. The output gas passes through a heat exchanger 108 to transfer heat to reactants (input stream/recycled stream) entering the reactor 102 and cool the output to a temperature appropriate for $NH_3$ removal.

Systems of the present invention can comprise a plurality of $NH_3$ adsorption cartridges 110/112. After exiting the heat exchanger 108 (and optionally passing through one or more valves 114/116), the cooled output gas flows through the one or more of the adsorption cartridges 110/112. The cooled output gas can be directed to (or diverted from) the one or more adsorption cartridges 110/112 via the one or more valves 114/116, which may be opened to allow the output gas to flow to the one or more adsorption cartridges 110/112 or closed to prevent flow of the cooled output gas to the one or more adsorption cartridges 110/112. The presence of a plurality of adsorption cartridges 110/112 can adsorb $NH_3$ from the cooled output gas. Also, as described herein, the $NH_3$ can be partially or fully desorbed from the one or more adsorption cartridges 110/112, which can be reused in the system 100.

At least a portion of the desorbed $NH_3$ gas can be transferred to one or more storage tanks 118. The remaining portion not transferred to one or more storage tanks 118 and any unused gases can be recycled in the system 100, thereby advantageously enabling continuous operation of the system 100. One or more valves 120/122/124/126 can be utilized to control the flow direction of the gas exiting the one or more adsorption cartridges 110/112. A series of one or more valves 128/130 can be used to direct the gas exiting the one or more adsorption cartridges 110/112 to one or more flares 132 or one or more compressors 134. Valve 136 can be used to transfer the gas from the compressor 134 to the flare 132. Valve 138 can direct the gas to one or more of an accumulator 140 and a pump 142. Multiple accumulator(s) 140 and/or pump(s) 142 may be used. After the accumulator(s) 140 and the pump(s) 142, the gas is sent to storage tank 118, and one or more storage tanks 118 may be used.

Unused reactants pass out of the plurality of $NH_3$ adsorption cartridges 110/112 and are directed through the heat exchanger 108 by a pump 144. In the heat exchanger 108, the unused reactants are heated (for example to, or nearly to, the reactor 102 temperature) by the heat of the reactor product stream. The reheated reactants are then directed from the heat exchanger 108 into the reactor 102.

During operation, the cooled output stream is directed through one or more of the $NH_3$ adsorption cartridges 110/112 until that cartridge or those cartridges are regenerated (e.g., all or a portion of the $NH_3$ is desorbed from the adsorbent material in the cartridge(s)). The criteria for regenerating the cartridge(s) may be based on any factor(s), such as a certain timing (e.g., planned maintenance) or an amount of $NH_3$ remaining in the stream exiting the cartridge (s). For example, the cooled output stream may be directed through the one or more $NH_3$ adsorption cartridges 110/112 until the cartridge(s) can no longer adsorb a desired fraction of the $NH_3$ from the product stream. The desired fraction of the product stream (e.g., the stream exiting the adsorption cartridges 110/112) $NH_3$ can be determined by the system operator and may be based on any criteria, such as particular operational requirements. The desired fraction of the product stream $NH_3$ can range from about 1% to about 100%. For example, in various embodiments, the desired fraction of the product stream ammonia can range from about 1% to about 50%, or from about 5% to about 25%, or from about 2% to about 5%. In other embodiments, the desired fraction of the product stream ammonia can range from about 50% to about 100%, or from about 75% to about 90%, or from about 95% to about 99%. The saturated $NH_3$ adsorption cartridge(s) (e.g., one of cartridges 110/112) is then isolated from the reactor 102 (e.g., via one or more valves) and the cooled output stream is directed to other $NH_3$ adsorption cartridge(s) (e.g., the other of the adsorption cartridges 110/112) by opening or closing appropriate valves (e.g., valve 114 or 116). As described herein, any number of $NH_3$ adsorption cartridges may be used. Thus, multiple $NH_3$ adsorption cartridges may be receiving a gas stream for adsorption at a same time, and multiple $NH_3$ adsorption cartridges may be isolated to desorb $NH_3$ from the adsorbent material in the cartridges at a same time.

Once isolated, the saturated $NH_3$ adsorption cartridge 110/112 is connected to the inlet side of a pump 134; the pump 134 reduces the pressure in the cartridge and causes $NH_3$ to desorb from the adsorbent material. The adsorption cartridge 110/112 may, but need not, be heated to foster the $NH_3$ desorption. The pump 142 output, comprising the desorbed $NH_3$, is directed to an accumulator 140. When the accumulator 140 has been filled with $NH_3$ gas, the pump 142 transfers it under pressure to storage vessel 118. The pump 142 preferably produces a high enough pressure, e.g., between about 50 psi and about 250 psi, in some embodiments about 150 psi at room temperature, to cause the $NH_3$ to liquefy in the storage vessel 118. If a single pump cannot provide sufficient pressure to liquefy the $NH_3$ at the desired storage vessel temperature, a plurality of pumps and accumulators in series can be used. The storage vessel 118 can, but need not, be cooled to promote or maintain liquefaction of the ammonia.

Figure 2:
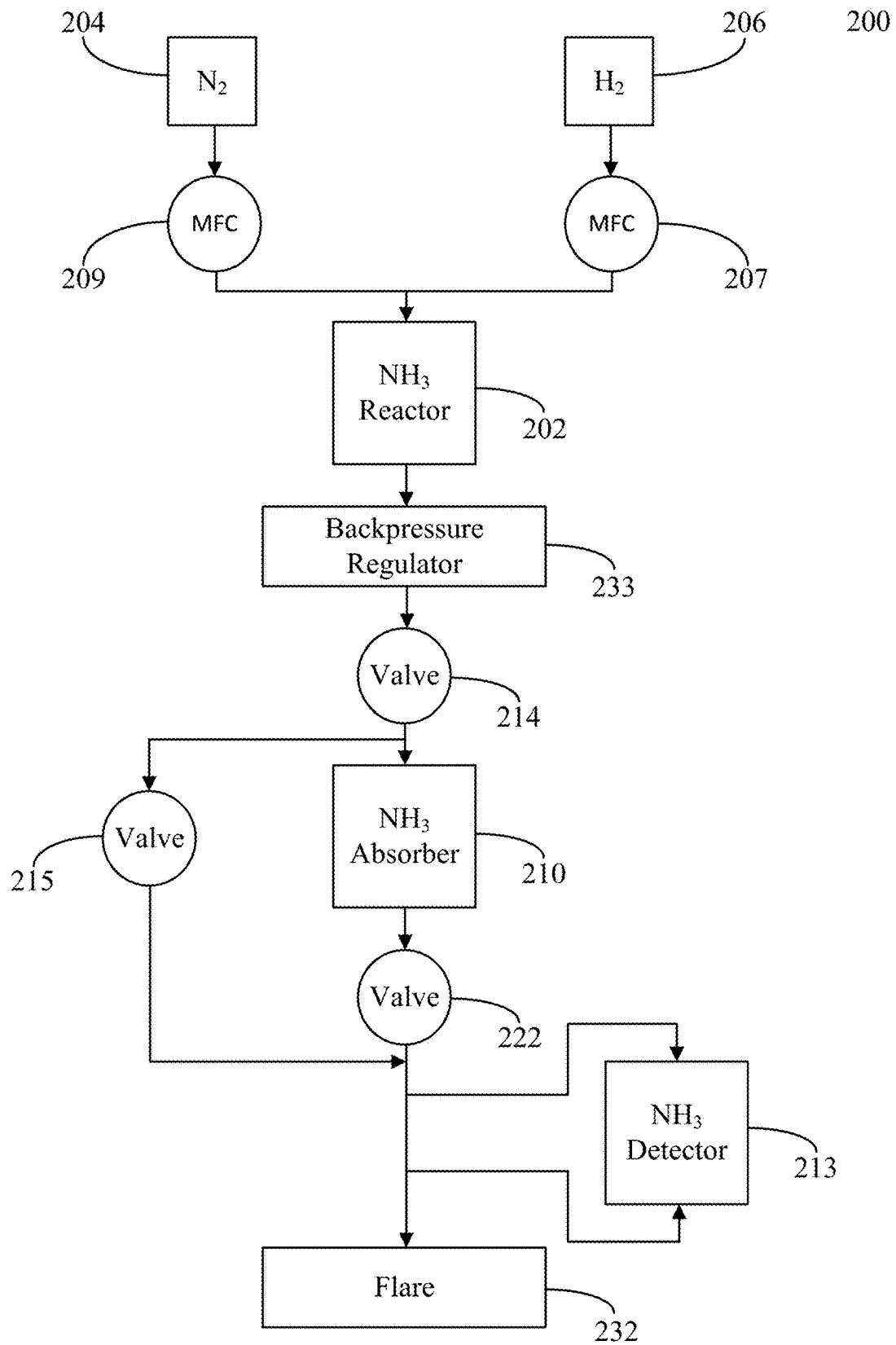
FIG. 2 illustrates a diagram of an $NH_3$ differential reactor that removes $NH_3$ from a reactor product stream by a molecular sieve, according to embodiments of the present invention.

FIG. 2 illustrates a system 200 of an embodiment of the present invention used for testing $NH_3$ adsorption in candidate adsorbers. In system 200, $N_2$ 204 and $H_2$ 206 gases flow from pressure cylinders through pressure regulators and mass flow controllers 207/209 to the $NH_3$ reactor 202. The $NH_3$ reactor 202 may be heated by external heaters. Upon contact with the catalyst, the $N_2$ and $H_2$ gases react to form some quantity of $NH_3$; the concentration of $NH_3$ produced depends on various reactor conditions. The product gas stream, comprising a mixture of $NH_3$, $N_2$, and $H_2$ gases, exits the reactor 202. The temperature and pressure of the product gas stream are reduced to near-ambient upon passing through an appropriately sized tubing (in some embodiments between about 1 and about 50 feet of between about ⅛" and about 1" diameter tubing, in some embodiments 3 feet of ¼") that may be made of stainless steel (or other suitable material) and a backpressure regulator 233 connected thereto.

The product stream then flows to an $NH_3$ adsorption cartridge assembly, comprised of valves 214/215/222 and adsorption cartridge 210. Valves 214/215/222 can be opened or closed to direct the product gas to either flow through the adsorption cartridge 210 or bypass the adsorption cartridge 210, as may be desirable during a particular operation. Downstream of the adsorption cartridge 210, tees allow an $NH_3$ detector 213 to sample the product gas and inject the sampled gas back into the product gas flow prior to entering a flare 232. Still further downstream, the product gas enters a flare 232 where the flammable gases are burned and the combustion products are exhausted to the atmosphere.

Example 1

A lab-scale differential test reactor was used to test the $NH_3$ removal capability of a type 4A molecular sieve. A diagram of the test reactor is illustrated, for example, in FIG. 2 and described herein. The description of Example 1 below will use various components illustrated in FIG. 2 by way of example. In Example 1, the type 4A molecular sieve was provided in the form of 1-2 millimeter (mm) beads purchased from Alfa Aesar (product number L05454).

The differential reactor operated with a supported Ruthenium (Ru) catalyst at a total pressure of 140 psig, a 3:1 $H_2:N_2$ flow ratio, and a 4 standard liter per minute (sLm) total gas input flow. The temperature of metal-sheathed thermocouples adjacent to the supported catalyst holder was determined to be about 580° C.; it is estimated that the reactants and supported catalyst were 100-150° C. cooler than the thermocouple temperature, e.g., between about 430° C. and about 480° C., due to the poor radiation absorption characteristics of the reactant gases and the low thermal conductivity of the catalyst support. Under these conditions, the reactor produced a product stream containing about 3200 parts per million (ppm) $NH_3$. The rate of $NH_3$ production was about 30.7 millimole (mmol) per hour, or about 0.52 grams (g) per hour (h).

The adsorption cannister (e.g., containing the adsorption cartridge 210) of the test reactor was a length of PVC pipe, having a length of about 36 inches and an inner diameter of about 0.5 inches, containing 74.937 g of 1-2 mm diameter type 4A molecular sieve beads. The pipe was oriented vertically during the test, with the product gas entering the lower end of the pipe and exiting the upper end. The length of the molecular sieve bed was about 24 inches. Stainless steel screens at each end of the pipe prevented the beads from moving into the ¼" gas lines.

Figure 3:
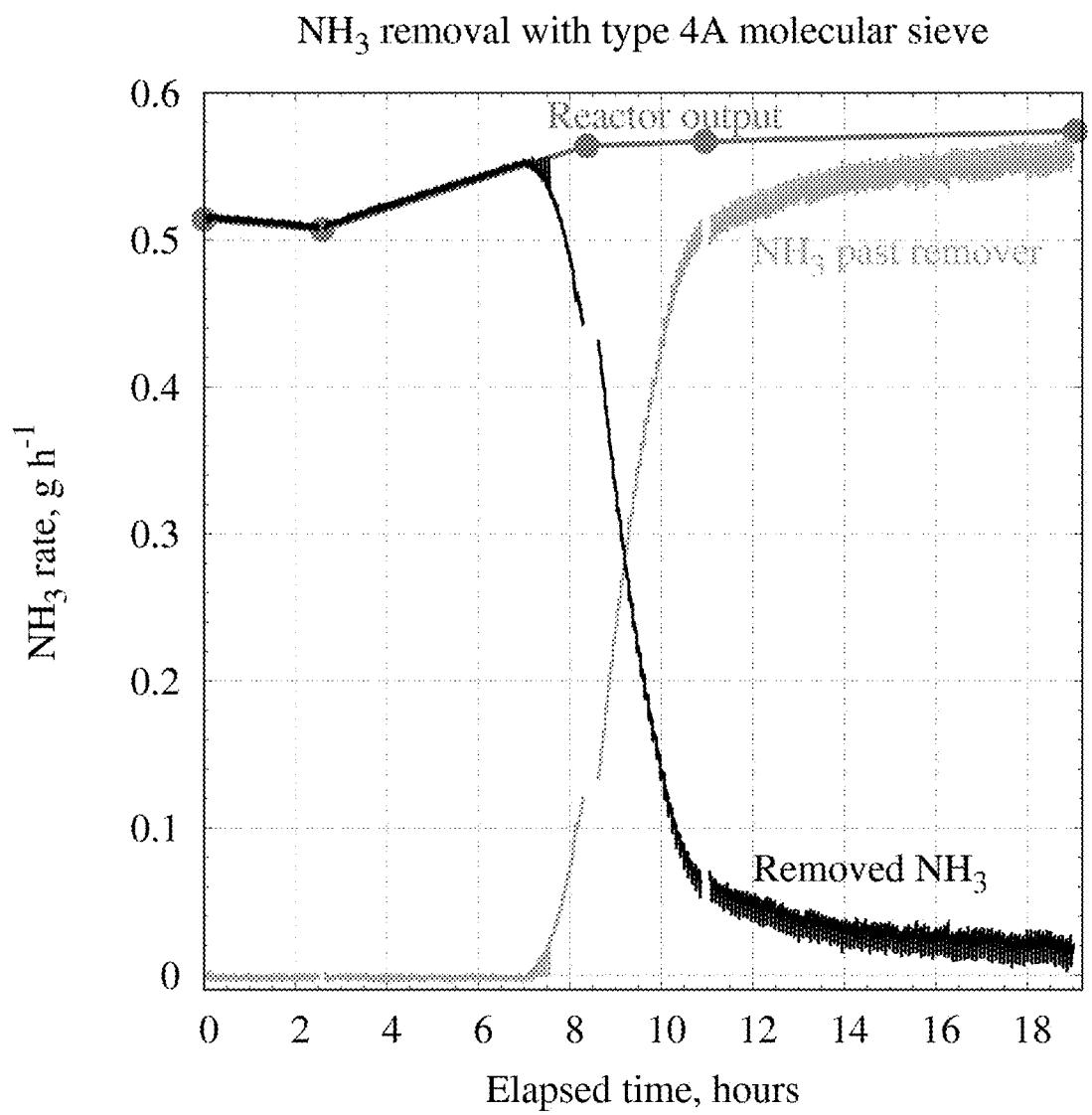
FIG. 3 illustrates a graph of removal of $NH_3$ from an $NH_3$ reactor product stream by a type 4A molecular sieve, according to embodiments of the present invention.

FIG. 3 illustrates the $NH_3$ removal capabilities of the test reactor. The rate of $NH_3$ synthesis by the reactor was measured by bypassing the $NH_3$ adsorption cartridge 210 at the times indicated by the filled circles, and sampling the product gas stream. The $NH_3$ synthesis rate between measurements was estimated by linear interpolation. The rate at which $NH_3$ exited the adsorption cartridge was measured by the $NH_3$ detector 213 when the cartridge was not being bypassed. During about the first 7 hours of the test, the $NH_3$ detector measured no $NH_3$ downstream of the adsorption cartridge (nominal 0 ppm $NH_3$ concentration), indicating that the adsorption cartridge removed all of the $NH_3$ in the product stream. After about 7 hours, the detector started measuring $NH_3$ downstream of the adsorption cartridge, indicating that the adsorbent material was no longer adsorbing substantially all of the produced $NH_3$. The adsorption cartridge continued to remove at least some $NH_3$ until the end of the experiment (19 hours).

The rate at which the adsorption cartridge adsorbed $NH_3$ is the difference between the synthesis rate and the passed-through rate. Numerically integrating the rate of adsorption indicated that the cartridge adsorbed about 3 g of $NH_3$ before the adsorption cartridge became saturated at about 7 hours. During the entire 19-hour experiment, the cartridge was calculated to adsorb about 5.00 g of $NH_3$. The mass of the adsorbent material was measured to be 80.318 g after the adsorption test, indicating an increase of mass of about 5.38 g during the test, or about 7% more than was calculated.

The adsorbent material exhibited a distinct $NH_3$ odor when removed from the cartridge. A combination of pumping the adsorbent material with a vacuum pump (pump inlet pressure between about 200 mtorr and about 1000 mtorr) and heating the adsorbent material (oven temperature between about 25° C. and about 200° C.) resulted in a reduction in mass of the absorbent material from 80.318 g to 75.022 g. Thus, about 98% of the adsorbed mass could be removed by a combination of pumping and heating, indicating that the molecular sieve can be used to extract low concentration $NH_3$ from a reactor product stream and then concentrate it in a storage vessel.

Example 2

A lab-scale differential test reactor was used to test the $NH_3$ removal capability of a type 5A molecular sieve. A diagram of the differential reactor is shown in FIG. 2, and is the same as was described in Example 1. The type 5A molecular sieve was provided in the form of 1-2 mm pellets purchased from Alfa Aesar (product number 87955).

The differential reactor operated with a supported Ru catalyst at a total pressure of 140 psig, a 3:1 $H_2$:$N_2$ flow ratio, and an 18 sLm total gas input flow. The temperature of metal-sheathed thermocouples adjacent to the supported catalyst holder was determined to be about 560° C. Under these conditions, the reactor produced a product stream containing about 2600 ppm $NH_3$. The rate of $NH_3$ production was about 1.9 g per hour.

The molecular sieve bed of the test reactor was a length of PVC pipe, having a length of about 36 inches and an inner diameter of about 0.5 inches, containing 75.0 g of 1-2 mm pellets of type 5A molecular sieve beads. The pipe was oriented vertically during the test, with the product gas entering the lower end of the pipe and exiting the upper end. The length of the molecular sieve bed was about 24 inches. Stainless steel screens at each end of the pipe prevented the beads from moving into the ¼" gas lines.

Figure 4:
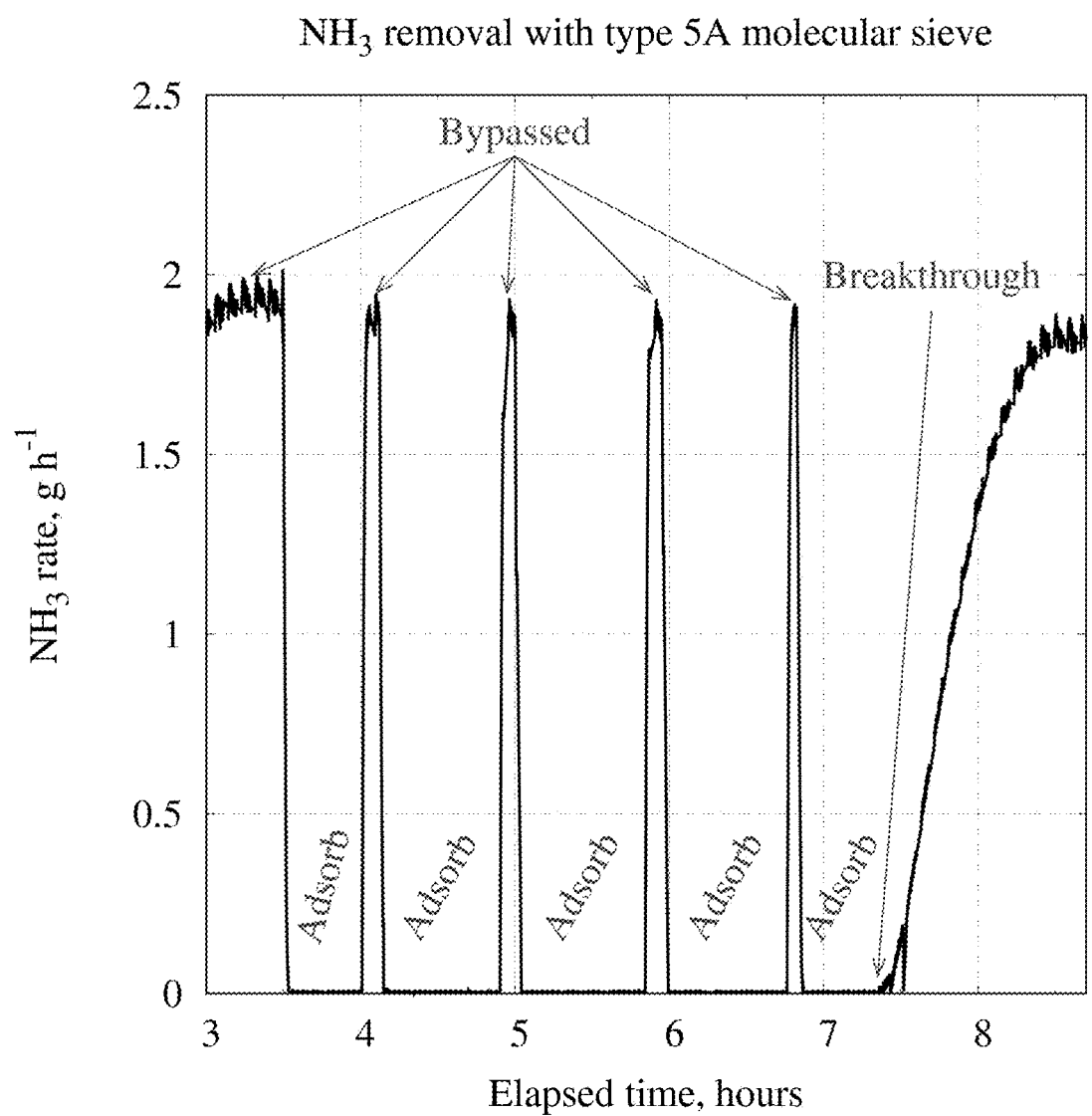
FIG. 4 illustrates a graph of removal of $NH_3$ from an $NH_3$ reactor product stream by a type 5A molecular sieve, according to embodiments of the present invention.

FIG. 4 illustrates the $NH_3$ removal capabilities of the type 5A molecular sieve in the test reactor. The rate of $NH_3$ synthesis by the reactor was measured by bypassing the $NH_3$ adsorption cartridge at the times indicated by the arrows and sampling the product gas stream. The $NH_3$ synthesis rate between measurements was estimated by linear interpolation. The rate at which $NH_3$ exited the adsorption cartridge was measured by the $NH_3$ detector when the cartridge was not being bypassed. During the first 3.5 hours of operation, the removal cartridge was bypassed while the reactor was allowed to stabilize. From about 3.5 hours to 7.5 hours, the reactor output was directed through the adsorption cannister except for during periodic samplings to check the reactor output. The $NH_3$ detector measured no $NH_3$ downstream of the adsorption cartridge (nominal 0 ppm $NH_3$ concentration), indicating that the adsorption cartridge removed all of the $NH_3$ in the product stream, up to about 7.5 hours. After about 7.5 hours, the detector started measuring $NH_3$ downstream of the adsorption cartridge, indicating that the adsorbent material was no longer adsorbing substantially all of the produced $NH_3$.

The adsorption rate data indicated 6.625 g of $NH_3$ was adsorbed by the type 5A molecular sieve prior to breakthrough. This equates to 8.8 wt % adsorption capability. The adsorbent material exhibited a distinct $NH_3$ odor when removed from the cartridge.

Example 3

A lab-scale differential test reactor was used to test the $NH_3$ removal capability of a type 13X molecular sieve. A diagram of the differential reactor is illustrated in FIG. 2, and is the same as was described in Example 1. The type 13X molecular sieve was provided in the form of 1-2 mm pellets purchased from Alfa Aesar (product number 87954, CAS 6323-69-6).

The differential reactor operated with a supported Ru catalyst at a total pressure of 140 psig, a 3:1 $H_2$:$N_2$ flow ratio, and a 16 sLm total reactant gas flow. The temperature of metal-sheathed thermocouples adjacent to the supported catalyst holder was determined to be about 580° C. Under these conditions, the reactor produced a product stream containing about 3000 ppm $NH_3$. The rate of $NH_3$ production was about 113 mmol/h (millimoles per hour), or about 1.94 g/h (grams per hour).

The molecular sieve bed of the test reactor was a length of PVC pipe, having a length of about 36 inches and an inner diameter of about 0.5 inches, containing 75.0 g of 1-2 mm pellets of type 13X molecular sieve. The pipe was oriented vertically during the test, with the product gas entering the lower end of the pipe and exiting the upper end. The length of the molecular sieve bed was about 24 inches. Stainless steel screens at each end of the pipe prevented the beads from entering the ¼" gas lines.

Figure 5:
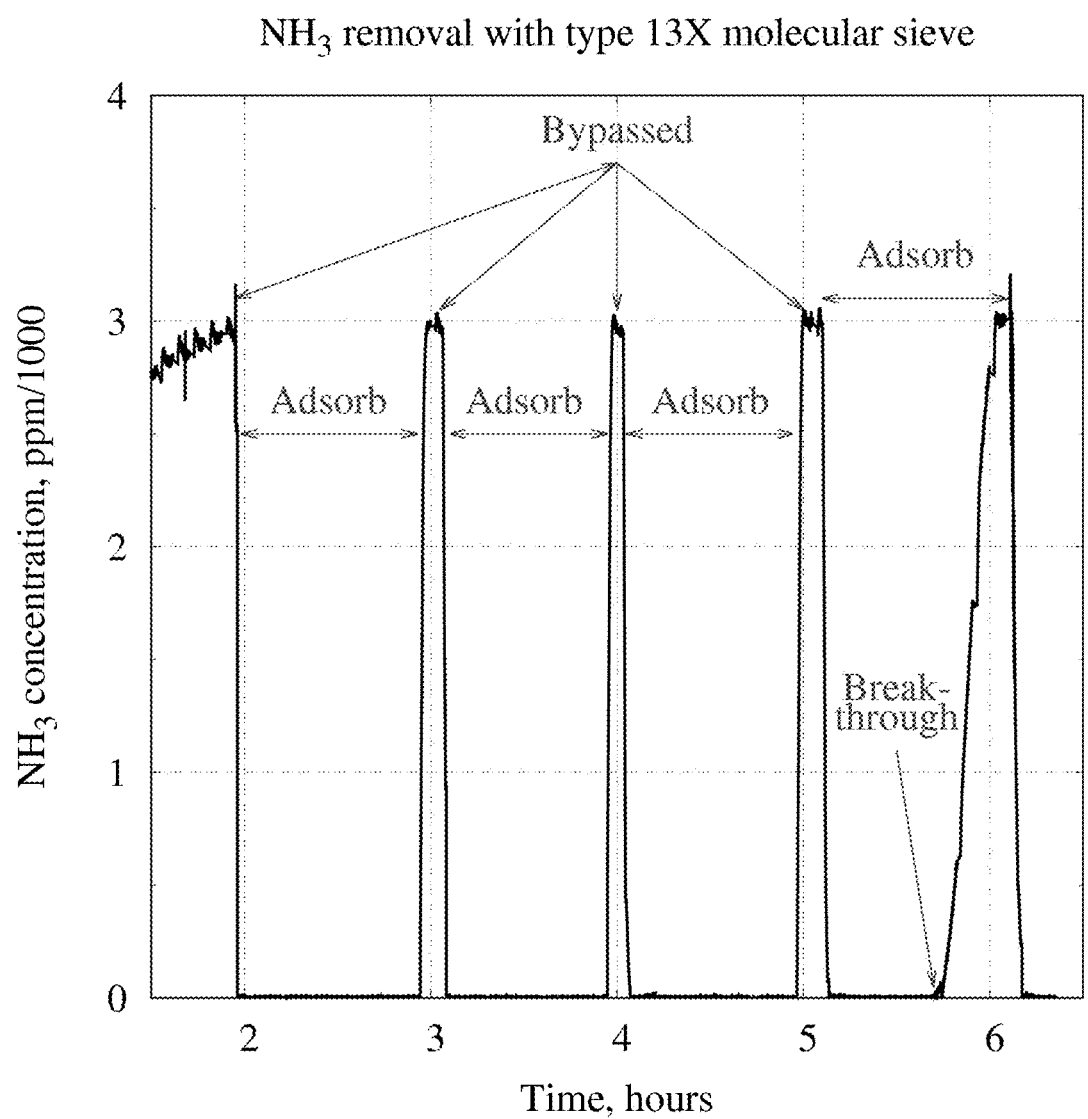
FIG. 5 illustrates a graph of removal of $NH_3$ from an $NH_3$ reactor product stream by a type 13X molecular sieve, according to embodiments of the present invention.

FIG. 5 illustrates the $NH_3$ removal capabilities of the test reactor. The rate of $NH_3$ synthesis by the reactor was measured by bypassing the $NH_3$ adsorption cartridge at the times indicated in the figure and sampling the product gas stream, with linear interpolation between measurements. The rate at which $NH_3$ exited the adsorption cartridge was measured by the $NH_3$ detector when the cartridge was not being bypassed. The reactor output was directed through the adsorption cannister starting around 2 hours in to the experiment. Up until approximately 5.7 hours, the $NH_3$ detector measured no $NH_3$ downstream of the adsorption cartridge (nominal 0 ppm $NH_3$ concentration), indicating that the adsorption cartridge removed all of the $NH_3$ in the product stream. At about 5.7 hours, the detector started measuring $NH_3$ downstream of the adsorption cartridge, indicating that the adsorbent material was no longer adsorbing substantially all the produced $NH_3$. At approximately 6 hours, the $NH_3$ detector was measuring about 3000 ppm $NH_3$ exiting the adsorption cannister, indicated that the cannister was no longer removing any $NH_3$ from the reactor output. This suggests improved/faster gas transport in the $NH_3$ removal cannister, which is advantageous.

The rate at which the adsorption cartridge adsorbed $NH_3$ is the difference between the synthesis rate and the passed-through rate. Numerically integrating the rate of adsorption indicated that the cartridge adsorbed about 6.57 g of $NH_3$ before any $NH_3$ was able to exit the cartridge. Thus the 13X molecular sieve was able to adsorb 8.8 wt % $NH_3$ prior to breakthrough.

Example 4

A prototype reactor similar to the design shown in FIG. 1 was used to demonstrate the removal of $NH_3$ from the reactor product stream by type 13X molecular sieve and recirculation of the reactants. The adsorption cannister contained approximately 37.8 (Liter) L of type 13X molecular sieve 8×12 mesh beads purchased from Delta Adsorbants.

The reactor was pressurized to 130 psig with $3H_2$:$1N_2$. The $NH_3$ adsorption cannister was supported by a scale so that its mass could be continuously monitored. $NH_3$ production at a series of temperatures and flows were examined, and a set of conditions that produced approximately 125 g $NH_3$/hour were selected for this example.

Figure 6:
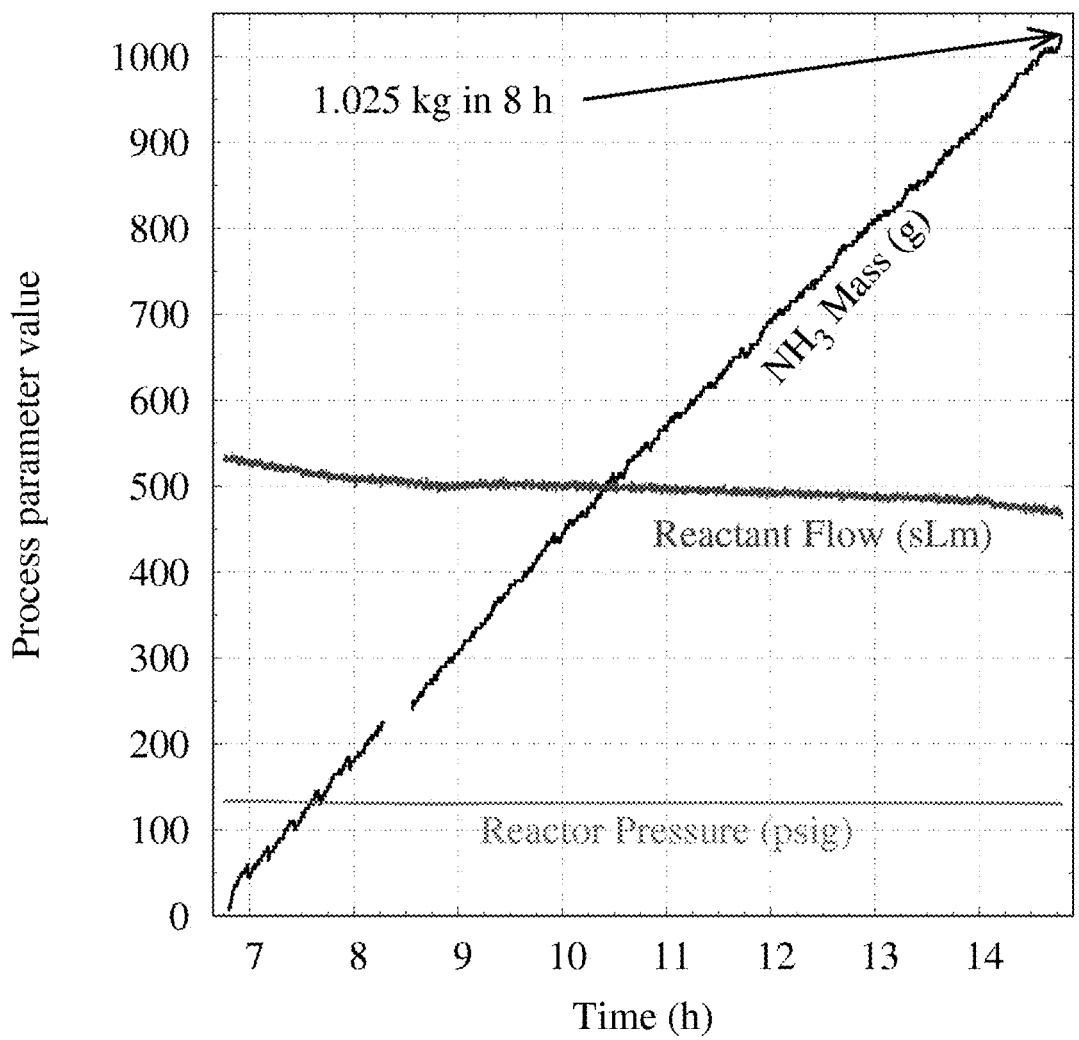
FIG. 6 illustrates a graph of accumulation of $NH_3$ in a type 13X molecular sieve operating in a prototype $NH_3$ reactor similar to that diagrammed in FIG. 1, according to embodiments of the present invention.

FIG. 6 illustrates the reactor pressure, reactant recirculation flow, and accumulated $NH_3$ mass in the adsorption cannister for a period of about 8 hours. During that time, the operating parameters and $NH_3$ accumulation rate remained nearly constant. Approximately 1 kilogram (kg) of $NH_3$ was removed from the product flow over the course of 8 hours. This demonstrates that gas phase adsorption can be used to capture $NH_3$ from continuously operating recirculated flow reactors operated at relatively low pressure compared to the industry standard 1500-2500 psig.

Example 5

A prototype reactor similar to the design in FIG. 1 was used to demonstrate the extraction of captured $NH_3$ from the adsorption cartridge and its liquefaction in a low-pressure vessel. The adsorption cannister contained approximately 37.8 L of type 13X molecular sieve 8×12 mesh beads purchased from Delta Adsorbants. Mass measurements indicated it had adsorbed approximately 0.7 kg of $NH_3$ from various reactor tests prior to this demonstration of $NH_3$ extraction.

After $NH_3$ accumulation in the cannister concluded, the cannister was at room temperature and pressurized to 130 psig with a mixture of $3H_2:1N_2$ and likely a small concentration of gaseous $NH_3$ due to its equilibrium partial pressure over the 13X adsorbant. To prepare for $NH_3$ extraction, the excess reactants were directed to a flare to reduce the cannister pressure to 0 psig. A pump then evacuated the cannister while at room temperature to remove the remaining nitrogen and hydrogen. The cannister was then isolated and heated to a nominal 250° C. using external heaters wrapped around the cannister. This caused the cannister pressure to increase to about −3 psig due to $NH_3$ desorbing from the 13X adsorbent.

Figure 7:
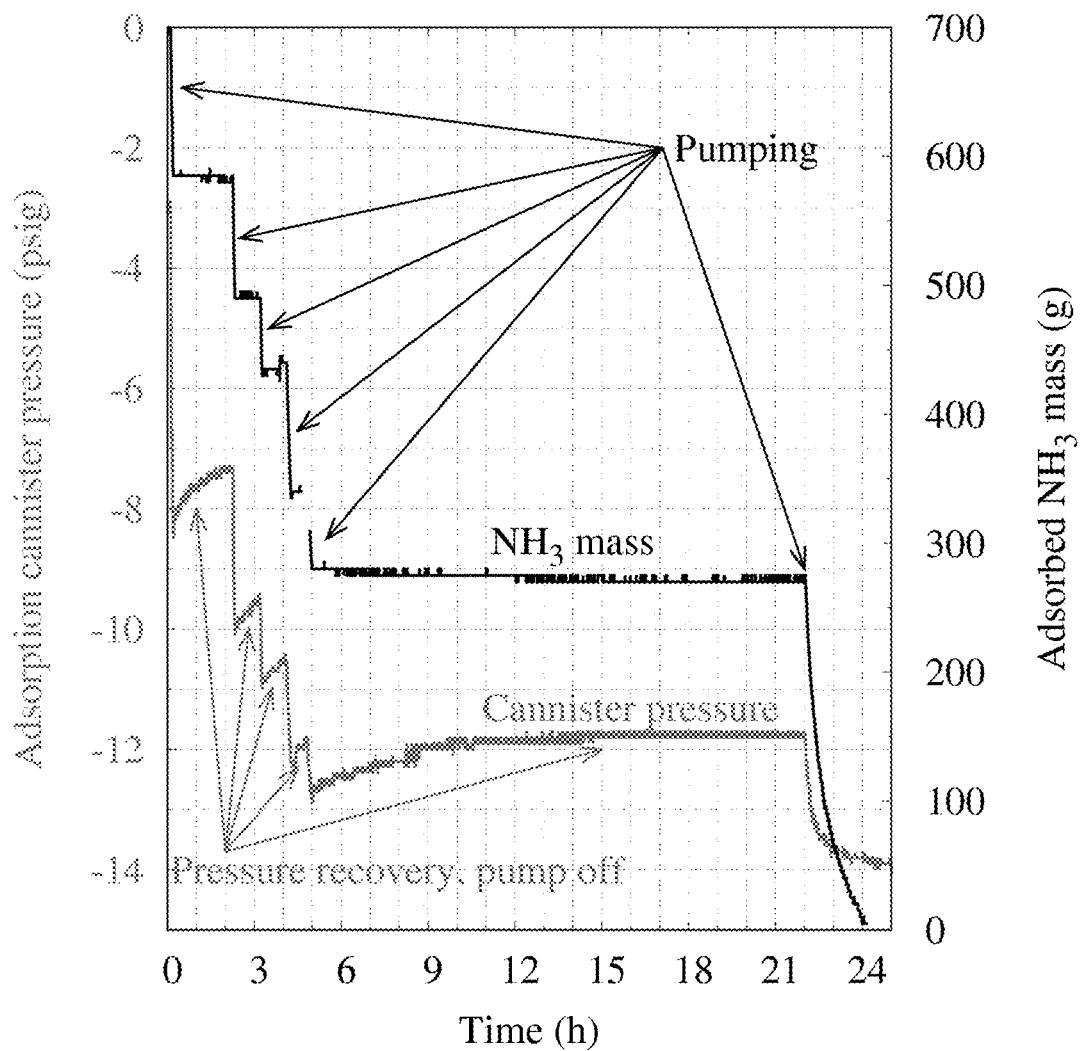
FIG. 7 illustrates a graph of removal of $NH_3$ from a 13X molecular sieve by heating and pumping in a prototype reactor similar to that diagrammed in FIG. 1, according to embodiments of the present invention.

FIG. 7 illustrates the extraction process starting from the cannister being at 250° C. and −3 psig. At time=0, valves were opened to allow a vacuum pump to extract $NH_3$ from the canister and deliver it to an accumulator. Within a few minutes, the cannister mass dropped by about 115 g and the pressure dropped to −8 psig, both indicating that $NH_3$ was being removed from the cannister. The output from the vacuum pump was directed to an accumulation bladder, the inflation of which also indicated $NH_3$ removal from the cannister. When the cannister pressure reached about −8 psig, the evacuation was stopped so the cannister pressure recovery could be monitored. From that time until about 2.2 hours, the cannister mass stayed constant and the pressure increased from −8 psig to about −7.3 psig, indicating $NH_3$ desorption from the 13X adsorbant. After 2.2 hours, the pumping was resumed. Throughout the rest of the $NH_3$ extraction process, the pumping was occasionally stopped to continue observing the pressure recovery. This caused the overall extraction process to take about 24 h, but the active $NH_3$ removal period was much shorter.

During $NH_3$ extraction, the output from the vacuum pump was directed to an accumulator bladder. In this implementation, the bladder was fabricated from a 7 mil high density polyethylene membrane. Other membrane materials could also be used as long as they are flexible and not damaged by $NH_3$ exposure. When the accumulator was filled, a second pump would extract $NH_3$ from it and compress it into a low-pressure vessel. The low-pressure vessel was kept in an ice bath to ease liquefaction. The pressure of the storage vessel as a function of temperature was appropriate for pure $NH_3$ contents.

Ranges have been discussed and used within the forgoing descriptions. One skilled in the art would understand that any sub-range within the stated range would be suitable, as would any number within the broad range, without deviating from the invention.

Additionally, the present embodiments may also be configured as:

(A1) An ammonia synthesis and storage system, including: a reactor configured to produce ammonia from a heated gas stream; a heat exchanger configured to heat an input gas stream including a nitrogen gas and a hydrogen gas to produce the heated gas stream and further configured to receive a product gas stream from the reactor and cool the product gas stream to produce a cooled product gas stream, where the product gas stream comprises at least one of an ammonia gas, an unspent nitrogen gas, and an unspent hydrogen gas; at least one adsorption cartridge configured to adsorb at least a portion of the ammonia gas from the cooled product gas stream; at least one desorption device to desorb at least a portion of the adsorbed ammonia from the at least one adsorption cartridge; and at least one ammonia storage vessel for receiving the desorbed ammonia.

(A2) The system according to (A1), where the input gas stream includes the nitrogen gas and the hydrogen gas combined with a recycled gas stream including a recycled amount of ammonia gas, a recycled amount of nitrogen gas, and a recycled amount of hydrogen gas.

(A3) The system according to any of (A1) to (A2), where heat from the product gas stream heats at least one of the input gas stream and a recycled gas stream to produce the heated gas stream.

(A4) The system according to any of (A1) to (A3), further including at least one product stream valve, where the at least one product stream valve directs the cooled product gas stream to one or more of the at least one adsorption cartridges.

(A5) The system according to any of (A1) to (A4), further including at least one post adsorber valve, where the at least one post adsorber valve directs a recycled stream to the reactor.

(A6) The system according to any of (A1) to (A5), where the recycled stream includes at least one of a recycled nitrogen gas, a recycled hydrogen gas, and a recycled ammonia gas.

(A7) The system according to any of (A1) to (A6), further including at least one recycling pump to recycle the recycled stream.

(A8) The system according to any of (A1) to (A7), where each of the at least one adsorption cartridges comprise molecular sieves.

(A9) The system according to any of (A1) to (A8), where each of the at least one adsorption cartridges are regenerated.

(A10) The system according to any of (A1) to (A9), further including at least one flare.

(A11) The system according to any of (A1) to (A10), further including at least one accumulator.

(A12) The system according to any of (A1) to (A11), further including at least one ammonia detector.

(A13) The system according to any of (A1) to (A12), where the at least one ammonia detector detects an amount of ammonia in the recycled stream.

(A14) The system according to any of (A1) to (A13), further including an alarm, where the alarm alerts when a predetermined amount of ammonia is detected in the recycled stream.

(A15) The system according to any of (A1) to (A14), where the reactor produces ammonia by at least one process selected from the group consisting of Haber-Bosch synthesis, electrically enhanced Haber-Bosch synthesis, solid state ammonia synthesis, electrochemical ammonia synthesis, and nonthermal plasma ammonia synthesis.

(A16) The system according to any of (A1) to (A15), where at least one of the molecular sieves includes a type 4A, type 5A, type 13X, or larger molecular sieve.

(A17) The system according to any of (A1) to (A16), where the molecular sieve includes a pore size of between about 3.4 angstroms and about 10 nm.

(A18) The system according to any of (A1) to (A17), where a material of the molecular sieve is an alkaline oxide aluminosilicate or an alkaline oxide borosilicate.

(A19) The system according to any of (A1) to (A18), where the desorption device is a compressor.

(A20) The system according to any of (A1) to (A19), where the desorption device is a compressor and a heater.

(A21) The system according to any of (A1) to (A20), where the compressor reduces a pressure of the at least one adsorption cartridges to desorb the ammonia from the at least one of the adsorption cartridge.

(A22) The system according to any of (A1) to (A21), where the pressure is between about 0 psia and about 15 psia, and a temperature between about 100° C. and about 300° C.

(A23) The system according to any of (A1) to (A22), where the heater increases a temperature of the at least one adsorption cartridge to between about 100° C. and about 300° C.

(A24) The system according to any of (A1) to (A23), where the compressor reduces a pressure of the at least one adsorption cartridge to between about 0 psia and about 15 psia, and where the heater increases a temperature of the at least one adsorption cartridge to between about 100° C. and about 300° C.

(A25) The system according to any of (A1) to (A24), where the compressor reduces a pressure of the at least one adsorption cartridge to between about 0 psia and about 15 psia, and where the heater increases a temperature of the at least one adsorption cartridge to between about 230° C. and about 270° C.

(A26) The system according to any of (A1) to (A25), where a temperature of the at least one ammonia storage vessel is between about 50° C. and about −50° C. and a pressure of the at least one ammonia storage vessel is between about 6 and about 294 psia.

(A27) A method for producing ammonia, including: heating an input gas stream including a nitrogen gas and a hydrogen gas with a heat exchanger to increase a temperature of the input gas stream to produce a heated gas stream; reacting the heated gas stream in a reactor to form a product gas stream, where the product gas stream includes at least one of an ammonia gas, the nitrogen gas, and the hydrogen gas; cooling the product gas stream with the heat exchanger to produce a cooled product gas stream; adsorbing the ammonia gas from the cooled product gas stream with at least one adsorption cartridge to produce ammonia on the at least one adsorption cartridge; desorbing the ammonia from the at least one adsorption cartridge with at least one desorbing apparatus; and storing the ammonia in at least one ammonia storage vessel.

(A28) The method according to (A27), where the input gas stream includes the nitrogen gas and the hydrogen gas combined with a recycled gas stream including a recycled amount of ammonia gas, a recycled amount of nitrogen gas, and a recycled amount of hydrogen gas.

(A29) The method according to any of (A27) to (A28), where heat from the product gas stream heats at least one of the input gas stream and a recycled gas stream to produce the heated gas stream.

(A30) The method according to any of (A27) to (A29), where heat from the product gas stream heats the input gas stream and a recycled gas stream at a same time to produce the heated gas stream.

(A31) The method according to any of (A27) to (A30), where the recycled gas stream includes at least one of a recycled ammonia, a recycled nitrogen gas, and a recycled hydrogen gas.

(A32) The method according to any of (A27) to (A31), where a hot side temperature of the heat exchanger is between about 300° C. and about 600° C. and a temperature of a cold side of the heat exchanger is between about 0° C. and about 200° C.

(A33) The method according to any of (A27) to (A32), where a hot side temperature of the heat exchanger is between about 300° C. and about 600° C. and a temperature of a cold side of the heat exchanger is between about 25° C. and about 100° C.

(A34) The method according to any of (A27) to (A33), where a temperature of the heated gas stream is between about 300° C. and about 600° C.

(A35) The method according to any of (A27) to (A34), where a temperature of the cooled product gas stream is between about 0° C. and about 200° C.

(A36) The method according to any of (A27) to (A35), where the at least one adsorption cartridge includes a molecular sieve.

(A37) The method according to any of (A27) to (A36), where a pore size of the molecular sieve is between about 3.4 angstroms and about 10 nm.

(A38) The method according to any of (A27) to (A37), where the molecular sieve is a type 4A, type 5A, type 13X, or larger molecular sieve.

(A39) The method according to any of (A27) to (A38), where a material of the molecular sieve is an alkaline oxide aluminosilicate or alkaline oxide borosilicate.

(A40) The method according to any of (A27) to (A39), where the at least one adsorption cartridge is reusable.

(A41) The method according to any of (A27) to (A40), further including directing the cooled product gas stream with at least one product gas stream valve to the at least one adsorption cartridge.

(A42) The method according to any of (A27) to (A41), further including closing the at least one product gas stream valve to remove ammonia from the at least one adsorption cartridge.

(A43) The method according to any of (A27) to (A42), further including detecting ammonia in the recycled gas stream.

(A44) The method according to any of (A27) to (A43), further including at least one 1° circulation pump to recycle the at least one of the recycled ammonia gas, the recycled nitrogen gas, or the recycled hydrogen gas to the reactor.

(A45) The method according to any of (A27) to (A44), further including combining the recycled gas stream and the input gas stream before entering the reactor.

(A46) The method according to any of (A27) to (A45), further including: directing the product gas stream with at least one product gas stream valve to the at least one adsorption cartridge; and closing the at least one product gas stream valve to remove the ammonia from the at least one adsorption cartridge.

(A47) The method according to any of (A27) to (A46), where the desorbing apparatus is at least one of a compressor or a heater.

(A48) The method according to any of (A27) to (A47), where the at least one desorbing apparatus is the compressor, where the compressor reduces a pressure of the at least one adsorption cartridge to desorb the ammonia from the at least one adsorption cartridge.

(A49) The method according to any of (A27) to (A48), where the pressure is between about 0 psia and about 15 psia.

(A50) The method according to any of (A27) to (A49), where the desorbing apparatus is the heater, and where the heater increases a temperature of the at least one adsorption cartridge to between about 100° C. and about 300° C.

(A51) The method according to any of (A27) to (A50), where the compressor reduces a pressure of the at least one adsorption cartridge to between about 0 psia and about 15 psia, and where the heater increases a temperature of the at least one adsorption cartridge to between about 100° C. and about 300° C.

(A52) The method according to any of (A27) to (A51), further including at least one accumulator, where the at least one accumulator accumulates the ammonia from the at least one adsorption cartridge.

(A53) The method according to any of (A27) to (A52), further including at least one valve to direct a gas.

(A54) The method according to any of (A27) to (A53), where a ratio of the nitrogen gas and the hydrogen gas in the input gas stream is about 75% hydrogen gas to about 25% nitrogen gas.

(A55) The method according to any of (A27) to (A54), where a ratio of the nitrogen gas and the hydrogen gas in the input gas stream is adjusted depending on a requirement of the reactor.

(A56) The method according to any of (A27) to (A55), further including at least one flare.

(A57) The method according to any of (A27) to (A56), where the reactor produces ammonia by at least one process selected from the group consisting of Haber-Bosch synthesis, electrically enhanced Haber-Bosch synthesis, solid state ammonia synthesis, electrochemical ammonia synthesis, and nonthermal plasma ammonia synthesis.

(A58) The method according to any of (A27) to (A57), where a temperature of the at least one ammonia storage vessel is between about 50° C. and about −50° C. and a pressure of the at least one ammonia storage vessel is between about 6 and about 294 psia.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described above is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. An ammonia synthesis and storage system, comprising:
   a reactor configured to produce ammonia from a heated gas stream;
   a heat exchanger configured to heat an input gas stream comprising a nitrogen gas and a hydrogen gas to produce the heated gas stream and further configured to receive a product gas stream from the reactor and cool the product gas stream to produce a cooled product gas stream, wherein the product gas stream comprises at least one of an ammonia gas, an unspent nitrogen gas, and an unspent hydrogen gas;
   at least one adsorption cartridge configured to adsorb at least a portion of the ammonia gas from the cooled product gas stream;
   at least one desorption device to desorb at least a portion of the adsorbed ammonia from the at least one adsorption cartridge; and
   at least one ammonia storage vessel for receiving the desorbed ammonia.

2. The system of claim 1, wherein the input gas stream comprises the nitrogen gas and the hydrogen gas combined with a recycled gas stream comprising a recycled amount of ammonia gas, a recycled amount of nitrogen gas, and a recycled amount of hydrogen gas.

3. The system of claim 1, wherein heat from the product gas stream heats at least one of the input gas stream and a recycled gas stream to produce the heated gas stream.

4. The system of claim 1, further comprising at least one product stream valve, wherein the at least one product stream valve directs the cooled product gas stream to one or more of the at least one adsorption cartridges.

5. The system of claim 1, further comprising at least one post adsorber valve, wherein the at least one post adsorber valve directs a recycled stream to the reactor.

6. The system of claim 5, wherein the recycled stream comprises at least one of a recycled nitrogen gas, a recycled hydrogen gas, and a recycled ammonia gas.

7. The system of claim 5, further comprising at least one recycling pump to recycle the recycled stream.

8. The system of claim 1, wherein each of the at least one adsorption cartridges comprise molecular sieves.

9. The system of claim 1, wherein each of the at least one adsorption cartridges are regenerated.

10. The system of claim 5, further comprising at least one ammonia detector that detects an amount of ammonia in the recycled stream.

11. The system of claim 8, wherein at least one of the molecular sieves comprises a 4A, 5A, 13X, or larger molecular sieve and wherein the molecular sieve comprises a pore size of between about 3.4 angstroms and about 10 nm.

12. The system of claim 11, wherein a material of the molecular sieve is an alkaline oxide aluminosilicate or an alkaline oxide borosilicate.

13. The system of claim 1, wherein the desorption device is a compressor and wherein the compressor reduces a pressure of the at least one adsorption cartridges to desorb the ammonia from the at least one of the adsorption cartridge.

14. A method for producing ammonia, comprising:
   heating an input gas stream comprising a nitrogen gas and a hydrogen gas with a heat exchanger to increase a temperature of the input gas stream to produce a heated gas stream;
   reacting the heated gas stream in a reactor to form a product gas stream, wherein the product gas stream comprises at least one of an ammonia gas, the nitrogen gas, and the hydrogen gas;
   cooling the product gas stream with the heat exchanger to produce a cooled product gas stream;
   adsorbing the ammonia gas from the cooled product gas stream with at least one adsorption cartridge to produce ammonia on the at least one adsorption cartridge;
   desorbing the ammonia from the at least one adsorption cartridge with at least one desorbing apparatus; and storing the ammonia in at least one ammonia storage vessel.

15. The method of claim 14, wherein heat from the product gas stream heats at least one of the input gas stream and a recycled gas stream to produce the heated gas stream.

16. The method of claim 14, wherein heat from the product gas stream heats the input gas stream and a recycled gas stream at a same time to produce the heated gas stream, and wherein the recycled gas stream comprises at least one of a recycled ammonia, a recycled nitrogen gas, and a recycled hydrogen gas.

17. The method of claim 14, wherein the at least one adsorption cartridge comprises a molecular sieve, wherein a pore size of the molecular sieve is between about 3.4 angstroms and about 10 nm, and wherein the at least one adsorption cartridge is reusable.

18. The method of claim 14, further comprising directing the cooled product gas stream with at least one product gas stream valve to the at least one adsorption cartridge, and closing the at least one product gas stream valve to remove ammonia from the at least one adsorption cartridge after detecting ammonia in the recycled gas stream.

19. The method of claim 14, wherein the at least one desorbing apparatus is a compressor and a heater, wherein the compressor reduces a pressure of the at least one adsorption cartridge to desorb the ammonia from the at least one adsorption cartridge, and wherein the heater increases a temperature of the at least one adsorption cartridge.

\* \* \* \* \*

UNITED STATES PATENT AND TRADEMARK OFFICE
CERTIFICATE OF CORRECTION

Page 1 of 1

PATENT NO. : 10,787,367 B2
APPLICATION NO. : 15/989946
DATED : September 29, 2020
INVENTOR(S) : Beach et al.

It is certified that error appears in the above-identified patent and that said Letters Patent is hereby corrected as shown below:

In the Specification

Please insert the following new section heading and new paragraph beginning at Column 1, Line 13, immediately preceding the section heading "FIELD OF THE INVENTION":

-- STATEMENT REGARDING FEDERALLY SPONSORED RESEARCH OR DEVELOPMENT
This invention was made with government support under grant number DE-AR0000685 awarded by the Department of Energy. The Government has certain rights in the invention. --

Signed and Sealed this
Twenty-seventh Day of September, 2022

Katherine Kelly Vidal
*Director of the United States Patent and Trademark Office*